Patented Jan. 24, 1939

2,144,953

UNITED STATES PATENT OFFICE 2,144,953

BRONZE OR METALLIC PASTE PIGMENTS

Othon Adolf Ziehl, Union, N. J., assignor to Metals Disintegrating Company, Inc., Elizabeth, N. J., a corporation of New Jersey No Drawing. Application June 13, 1936, Serial No. 85,051. In Germany May 16, 1936

4 Claims. (Cl. 134—76)

This invention relates to improvements in bronze of metallic paste pigments suitable for subsequent admixture with varnish and the like to form metal pigmented paints. Pigment pastes of the kind contemplated consist essentially of metal flakes and a vehicle or thinner which is relatively innocuous to the leafing or mirroring property that has been imparted to the metal flakes either during or subsequent to their formation.

A satisfactory method of preparing pastes of this kind is set forth in Letters Patent of the United States No. 2,002,891. In the preferred method comminuted metal, a liquid thinner such as the petroleum fraction oil referred to in said Letters Patent, and a leafing or floating agent (sometimes known as a grease) such as stearic or palmitic acid are charged into a ball mill which is then operated to reduce the metal to flake-like particles and simultaneously impart the desired leafing or mirroring property to the metal flakes which causes them to leaf or float in varnish or the like and to possess a desirable high sheen or brilliancy.

The product in the mill is in the form of a sludge which is capable of immediate use as a bronze paste. Usually however it contains an excess of the liquid phase or thinner, while on the other hand it is generally of too thick a consistency to be readily removed from the mill. To obtain a paste of the desired consistency it is advisable therefore to remove a part of the liquid from the mill paste, as by filtration, and to facilitate this operation it is advantageous to add more liquid to the mill paste to increase its mobility and render it capable of being conveyed with ease to a filter press or the like.

This filtration operation not only removes excess thinner but with it certain impurities which have a deleterious effect on the brightness and leafing characteristics of the final paste pigment. These impurities are known to be carried in the thinner, for on repeated reuse of a certain quantity of thinner it eventually becomes so contaminated with them as to be useless. The initial dilution of the mill paste with fresh thinner also assists in removing the impurities. The filtrate from the filter press may be reused in the process but, as indicated above, it cannot be reused indefinitely. It has eventually to be discarded even though employed only in diluting mill paste. The filter cake can also, or alternatively, be washed with fresh thinner to reduce the entrained impurities still further.

The filter cake so secured is relatively dry and in the case of aluminium may contain 78% or more of metal. Commercial aluminium pastes, however, usually contain from 60% to 80% of metal and hence the filter cake has generally to be adjusted. This hitherto has been done by simply adding the desired amount of thinner.

Pastes may also be made from flaked metal by mixing it with a suitable thinner. The flaked metal may already possess the leafing property or this quality may be imparted to it in the presence of a thinner.

As a result of the flaking and leafing operations these pastes include a small amount of free leafing agent; the amount of free stearic acid so provided in an aluminium paste may be 1% of the total weight of the paste. The method employed in making the paste affects its quality and also the amount of free leafing agent that may be present. The preferred ball mill process outlined above produces the highest grade material which however contains a low amount of free leafing agent. These pastes can be dried to give leafing bronze powders as is set forth in said Letters Patent, and such powders retain their leafing properties indefinitely; the pastes also retain their leafing properties for long periods of time and in the vast majority of cases no deterioration is observed. In odd cases, however, the leafing property has been known to disappear after a considerable time, and while the causes are not fully understood, I believe it to be due to imperfections in packing, presence of moisture and high temperatures.

If a paste is permitted to dry out slowly over an extended period of time it may lose some or all of its leafing characteristics and it is therefore the object of this invention to obviate or reduce the occurrence of this phenomenon.

This invention is based on the observation that under adverse conditions of storage or use, such as relatively high temperatures, presence of moisture, or slow drying due to defective containers, the leafing stability of a metallic pigment paste of the kind described is dependent upon the amount of free leafing agent present in it. The greater the amount of leafing agent the more resistant is the paste to loss of its leafing qualities.

According to this invention, therefore, metallic pigment pastes containing leafing metallic particles and a thinner which is substantially innocuous to the leafing film, are improved by incorporating an amount of leafing agent in addition to that which is normally present in a paste made from a substantially dry mass of leafing flaked metal. The additional leafing agent appears to act as a stabilization reserve, and it is advantageous to incorporate it after the desired leafing propery has been imparted to the metal flakes. Among other reasons there is then no doubt that the paste contains the desired excess of leafing agent. Stearic and/or palmitic acid is the preferred leafing agent and I have found that an addition of the order of 1% of the amount of metal in a paste greatly improves its resistance to the deterioration of its leafing properties.

In the preferred method the paste is formed by simultaneous flaking and leafing by impact grinding in a ball mill in the presence of a liquid thinner and a leafing agent, the product thus obtained being then filtered to form a relatively dry filter cake, and thereafter formed into a paste by mixing the fiber cake with a thinner and the floating or leafing agent. It is advisable as indicated above to mix the mill paste with thinner or solvent prior to or during its filtration. The amount of leafing agent added to the filter cake is preferably equal to 1% of the weight of the metal.

Neither the thinner nor the leafing agent employed in the final formation of paste need be identical with the corresponding substances employed in the initial paste-forming operations. The petroleum fraction oil mentioned in said Letters Patent is the preferred thinner because it is cheap, has a high flash point and is readily miscible with most varnish vehicles. Other solvents may however be used and it is sometimes advantageous to adjust a filter cake or other paste of high metal content containing said thinner with another thinner, since the particular petroleum fraction oil is not readily miscible with some vehicles such as those containing nitrocellulose, and when use with such a varnish or lacquer is contemplated it is then better to employ a more compatible solvent such as xylol, toluol or hydrogenated naphtha. Of course these alternative solvents may be used in the initial paste-forming operations in place of the petroleum fraction oil, but since they are more expensive and frequently have low flash points it is better to use the petroleum fraction oil in the initial stages even though the pigment paste is intended for use with vehicles with which that petroleum fraction oil is less compatible, because I have observed that compatible mixtures are easily formed if the pigment paste does not include an excessive amount of the petroleum fraction oil. Thus a filter cake containing 80% of metal and 20% of the petroleum fraction oil can readily be adjusted with a thinner other than the petroleum fraction oil.

While the process herein set forth is particularly suitable in connection with aluminium pastes it may be applied to a greater or less extent to other metallic pastes such as those containing copper, brass, tin or zinc.

The improvement effected by the invention is well illustrated by adjusting a filter cake containing 78% aluminium to form a 65% metal paste by mixing it with (a) fresh thinner and (b) thinner containing stearic acid in solution in an amount equal to about 1% based on metal and permitting the two pastes to dry slowly by placing them in cans having perforated lids covered with a cloth. The two pastes initially have substantially identical leafing abilities (75%). Under these exceptional conditions while the leafing ability of (a) is dropping to 36% that of (b) is maintained. The leafing was estimated by the method described by Edwards in "Aluminum Bronze Powder and Aluminum Paint" (New York 1927 The Chemical Catalog Company), pages 23 and 24.

It will be appreciated that this test is an attempt to reproduce experimentally certain adverse conditions of storage occasionally met with in practice. Tests under conditions of high humidity give comparable results.

I claim:

1. The method of preparing a paste pigment of the kind described which retains its leafing properties under adverse conditions of storage and use, which consists in reducing metal particles to the form of flakes of suitable size and thickness in a liquid made up of a thinner and a leafing agent, whereby the flake surfaces are furnished with a leafing film; then treating the flake-and-liquid mixture to substantially remove therefrom the liquid and the matter, other than the metal flakes, carried therein, including impurities incidental to the flaking and leafing operations, and uncombined leafing agent, without substantial impairment of said leafing film; and thereafter mixing a relatively dry mass of the flakes so produced with fresh thinner to make a paste of desired consistency and metal content and with a charge of fresh leafing agent constituting a definite surplus over and above the amount of leafing agent in the dry mass before the addition of the charge, whereby the paste contains a stabilization reserve of leafing agent to improve the resistance of the flakes to deterioration of their leafing properties, substantially as set forth.

2. The method set forth in claim 1, in which the thinner initially employed is mineral spirits, while the fresh thinner is one selected from a group consisting of xylol, toluol, and hydrogenated naphtha, substantially as and for the purposes set forth.

3. The method set forth in claim 1, in which the flaking and leafing operations are conducted in a ball mill, and in which the mixture of flakes, liquid, and impurities found in the mill at the close of said operations is diluted with thinner prior to the operation of separating out the flakes.

4. The method of preparing a paste pigment of the kind described which retains its leafing properties under adverse conditions of storage and use, which consists in reducing metal particles to the form of flakes of suitable size and thickness in a liquid made up of a thinner and a leafing agent, whereby the flake surfaces are furnished with a leafing film; then treating the flake-and-liquid mixture to substantially remove therefrom the liquid and the matter, other than the metal flakes, carried therein, including impurities incidental to the flaking and leafing operations, and uncombined leafing agent, without substantial impairment of said leafing film; and thereafter mixing a relatively dry mass of the flakes so produced with fresh thinner to make a paste of desired consistency and metal content and with a charge of fresh leafing agent amounting to about 1% of the weight of the metal, sufficient to provide a stabilization reserve of leafing agent to improve the resistance of the flakes to deterioration of their leafing properties, substantially as set forth.

OTHON A. ZIEHL.